(12) United States Patent
Ho (10) Patent No.: US 9,374,831 B2
(45) Date of Patent: Jun. 21, 2016

(54) NETWORK COEXISTENCE THROUGH ACTIVE SUPERFRAME INTERLEAVING

(75) Inventor: Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 155 days.

(21) Appl. No.: 13/230,546

(22) Filed: Sep. 12, 2011

(65) Prior Publication Data

US 2012/0063395 A1    Mar. 15, 2012

Related U.S. Application Data

(60) Provisional application No. 61/382,082, filed on Sep. 13, 2010.

(51) Int. Cl.
  *H04W 16/14* (2009.01)
  *H04W 72/12* (2009.01)

(52) U.S. Cl.
  CPC .......... *H04W 72/1215* (2013.01); *H04W 16/14* (2013.01)

(58) Field of Classification Search
  CPC ... H04W 4/06; H04W 68/00; H04W 72/1215; H04W 16/14; H04L 12/12; H04L 12/44
  USPC ......... 370/228, 331, 328, 329, 336, 345–348, 370/433, 437, 442, 447, 458, 459, 461–462
  See application file for complete search history.

(56) References Cited

U.S. PATENT DOCUMENTS

| | | | | |
|---|---|---|---|---|
| 7,133,373 B2 * | 11/2006 | Hester et al. | | 370/311 |
| 8,295,217 B2 * | 10/2012 | Kone et al. | | 370/311 |
| 2005/0089058 A1 * | 4/2005 | Hong et al. | | 370/445 |
| 2006/0114866 A1 * | 6/2006 | Kim et al. | | 370/338 |
| 2006/0240799 A1 * | 10/2006 | Kim et al. | | 455/343.2 |
| 2007/0147333 A1 * | 6/2007 | Makhijani | | 370/347 |
| 2007/0280157 A1 * | 12/2007 | Kwon et al. | | 370/329 |
| 2008/0144560 A1 * | 6/2008 | Jia et al. | | 370/312 |
| 2009/0067389 A1 * | 3/2009 | Lee et al. | | 370/336 |
| 2009/0257410 A1 * | 10/2009 | Liu | | 370/336 |
| 2010/0272076 A1 * | 10/2010 | Cavalcanti | | 370/336 |
| 2010/0273419 A1 * | 10/2010 | Rajagopal et al. | | 455/41.2 |
| 2010/0278156 A1 * | 11/2010 | Shin et al. | | 370/337 |
| 2011/0007672 A1 * | 1/2011 | Park et al. | | 370/280 |
| 2011/0170527 A1 * | 7/2011 | Yamamoto et al. | | 370/338 |
| 2011/0268055 A1 * | 11/2011 | Patel et al. | | 370/329 |

* cited by examiner

*Primary Examiner* — Chandrahas Patel
*Assistant Examiner* — Lan Huong Truong
(74) *Attorney, Agent, or Firm* — Steven A. Shaw; Frank D. Cimino (57) ABSTRACT

Embodiments of the invention provide coexistence among independent networks through active superframe interleaving. Network hubs and devices exchange signals over a selected channel only during active superframes of their network. Network hubs broadcast coexistence information during their active superframes. A hub of network B desiring to use the selected channel first attempts to fit its active superframes within network A's inactive superframes, if available. If network A is not providing inactive superframes, then the network B hub determines whether network A is willing to coexist using active superframe interleaving on the channel. If so, the network B hub sends an interleave request message to the network A hub, which may accept the message and send back an interleave response message. The network A hub then offers new inactive superframes, and the network B hub adapts the transmissions and receptions of network B to fit within these inactive superframes.

19 Claims, 9 Drawing Sheets

NETWORK COEXISTENCE THROUGH ACTIVE SUPERFRAME INTERLEAVING

CROSS-REFERENCE TO RELATED APPLICATIONS

This application claims the benefit of the filing date of U.S. Provisional Patent Application No. 61/382,082 which is titled "BAN Coexistence through Active Superframe Interleaving" and was filed Sep. 13, 2010, the disclosure of which is hereby incorporated by reference herein in its entirety.

TECHNICAL FIELD

Embodiments of the invention are directed, in general, to networks having a hub in communication with multiple nodes and, more specifically, to the coexistence of multiple such networks on a same channel.

BACKGROUND

Two or more devices may communicate with each other using predefined channels. There is an advantage in predefining the channels for a particular type of devices, because the devices then have a known set of channels on which to hunt for other similar devices. Additionally, using a known set of channels, the devices are all capable of moving to another channel within the set if required to avoid interference or noise. The known set of channels may be defined by a standards or regulatory body so that other unrelated devices are not allowed to use the channels.

In some systems, one device may act as hub that establishes network connections with other related devices, which act as nodes in a network. The devices in the network may communicate using the predefined channels. The network may be established, for example, to serve a particular group of users or to support a particular service provider. Other devices that are associated with other users or other service providers may form additional independent networks. In other situations, a hub device may be capable of serving a limited number of nodes and, therefore, other networks may be formed due to network size limitations. These other networks use the same set of predefined channels.

When two or more networks are operating in the same general physical location, they typically need to select different operating channels for each network to avoid interference. In such a situation, for example, the hub in a newly formed network may monitor the channel set to identify an available channel for use in the new network. However, if the set of predefined channels is small or if a greater number of networks are operating at the same time in the one location than the number of predefined channels, then no channels may be available for the new network's sole use.

SUMMARY

Embodiments of the invention provide active superframe interleaving between two networks, such as body area networks (BAN), that share the same operating channel with no or minimal mutual interference.

A first BAN (BAN 1) may at any time share the same operating channel with a second BAN (BAN 2) by interleaving their active superframes. Depending upon the operating conditions, the networks—BAN 1 and BAN 2—may interleave their active superframes either without requiring active superframe adjustment or with requiring active superframe adjustment.

Regardless of whether BAN 1 is operating with a superframe length and inactive duration that are suitable for interleaving BAN 1 and BAN 2's active superframes, BAN 2's hub (Hub 2) may send to BAN 1's hub (Hub 1) a Command—Active Superframe Interleaving Request frame to request active superframe interleaving between the two BANs. However, before sending the Command—Active Superframe Interleaving Request frame, Hub 2 first must receive a beacon or B2 frame of Hub 1 with a Superframe Interleaving field in the MAC header set to indicate support for active superframe interleaving.

If BAN 1 supports active superframe interleaving, which is indicated in the MAC header of its beacon or B2 frame, Hub 1 sends a Command—Active Superframe Interleaving Response frame to Hub 2 to indicate whether Hub 1 accepts or rejects the active superframe interleaving request. If Hub 1 accepts the request, in some cases, it may continue with its current superframe length and inactive duration to enable the offered active superframe interleaving. In other cases, Hub 1 adjusts its superframe length and inactive duration to enable the offered active superframe interleaving before sending its response.

Hub 1 should accept the request if it may continue with its current superframe length and inactive duration to enable the requested superframe interleaving. Hub 1 may deny the request if its inactive duration has been mostly taken by other hubs also for active superframe interleaving. Hub 1 should also accept the request from Hub 2, if Hub 1 has a lower BAN priority than Hub 2.

BRIEF DESCRIPTION OF THE DRAWINGS

Having thus described the invention in general terms, reference will now be made to the accompanying drawings, wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment, a network may comprise a hub device that is in communication with a plurality of node devices. Two or more of these networks may be located within the same area. Generally, the individual networks operate independently of one another, and each hub is responsible for controlling the communications with the nodes in its network. However, when two or more networks are operating near one another, one or more of the hub devices may determine that the transmissions within the individual networks should be coordinated across the networks. This may be helpful to reduce interference between the network when they are operating on the same channel or on close frequencies.

Within a network, a hub may organize communications within its network by defining repetitive periods or intervals for medium access by itself and nodes it its network. These periods may be, for example, beacon periods or superframes that define repetitive time intervals referenced by the hub and nodes in the network for medium access. The superframe repeats in intervals of equal duration. The hub may transmit zero, one or more beacon signals during the superframe. The term superframe is used herein to simplify the discussion, but will be understood to be synonymous to beacon period or the like.

Superframe Format

Figure 1:
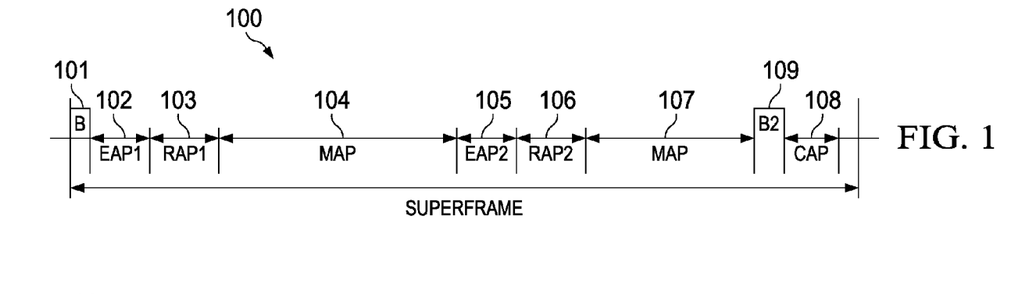
FIG. 1 illustrates an example of a superframe according to one embodiment.

FIG. 1 illustrates an example of superframe 100 according to one embodiment. Superframe 100 is operating in a beacon mode as a beacon period. In an active superframe, the hub transmits a beacon 101 and provides access phases 102-108. Beacon (B) 100 is a frame transmitted by the hub to facilitate network management, such as medium access coordination, node power management, and clock synchronization within the network, and to facilitate coexistence of networks. Access phases 102-108 are used by the hub and its associated nodes to exchange management, control, and data type frames.

In one embodiment, superframe 100 may be used in a Body Area Network (BAN) using the procedures described in the document identified as IEEE P802.15.6™/D04 and titled "Draft Standard for Information Technology—Telecommunications and Information Exchange Between Systems—Local and Metropolitan Area Networks—Specific Requirements—Part 15.6: Wireless Medium Access Control (MAC) and Physical Layer (PHY) Specifications for Wireless Personal Area Networks (WPANs) used in or around a body," which was published in June 2011 by the Institute of Electrical and Electronics Engineers, Inc., the disclosure of which is hereby incorporated herein by reference in its entirety.

In the illustrated embodiment, superframe 100 includes first exclusive access phase (EAP1) 102, first random access phase (RAP1) 103, managed access phase (MAP) 104, second exclusive access phase (EAP2) 105, second random access phase (RAP2) 106, additional managed access phase (MAP) 107, and contention access phase (CAP) 108. EAP1 or EAP2 is an interval set aside by the hub for transfer of traffic for the highest user priority. This may include, for example, emergency or medical event reporting. RAP1 or RAP2 is an interval set aside by the hub for random access to the medium by network nodes. The managed access phase (MAP) is an interval set aside by the hub for improvised access, scheduled access, and unscheduled access to the medium by the hub and the nodes. The contention access phase (CAP) is an interval left over by the hub in the superframe for random access to the medium by network nodes.

The hub may set the length of any of these access phases to zero. In one embodiment, RAP1 and CAP may have guaranteed minimum lengths to support the network nodes, as announced, for example, in a connection assignment frame.

In an active superframe 100, network nodes may obtain contended allocations during EAP1 102, EAP2 105, RAP1 103, RAP2 106, and CAP 108, to initiate frame transactions. The hub may arrange scheduled uplink, downlink and bilink allocation intervals, provide unscheduled bilink allocation intervals, and improvise certain immediate polled and posted allocation intervals only in a MAP (104, 107). In EAP1, EAP2, RAP1, RAP2, CAP, or MAP, the hub may also improvise future polls or posts starting and ending in a MAP.

In addition to the active superframes 100 discussed above, the hub may also maintain a number (I) of inactive superframes after each active superframe 100. There can be no allocation intervals scheduled in the inactive superframes. The number I of inactive superframes may be any positive integer chosen and announced by the hub. In the inactive superframes, the hub does not transmit any beacon or any other frames, and does not provide any access phases for the nodes in its network to transmit in.

Superframe Interleaving

Figure 2:
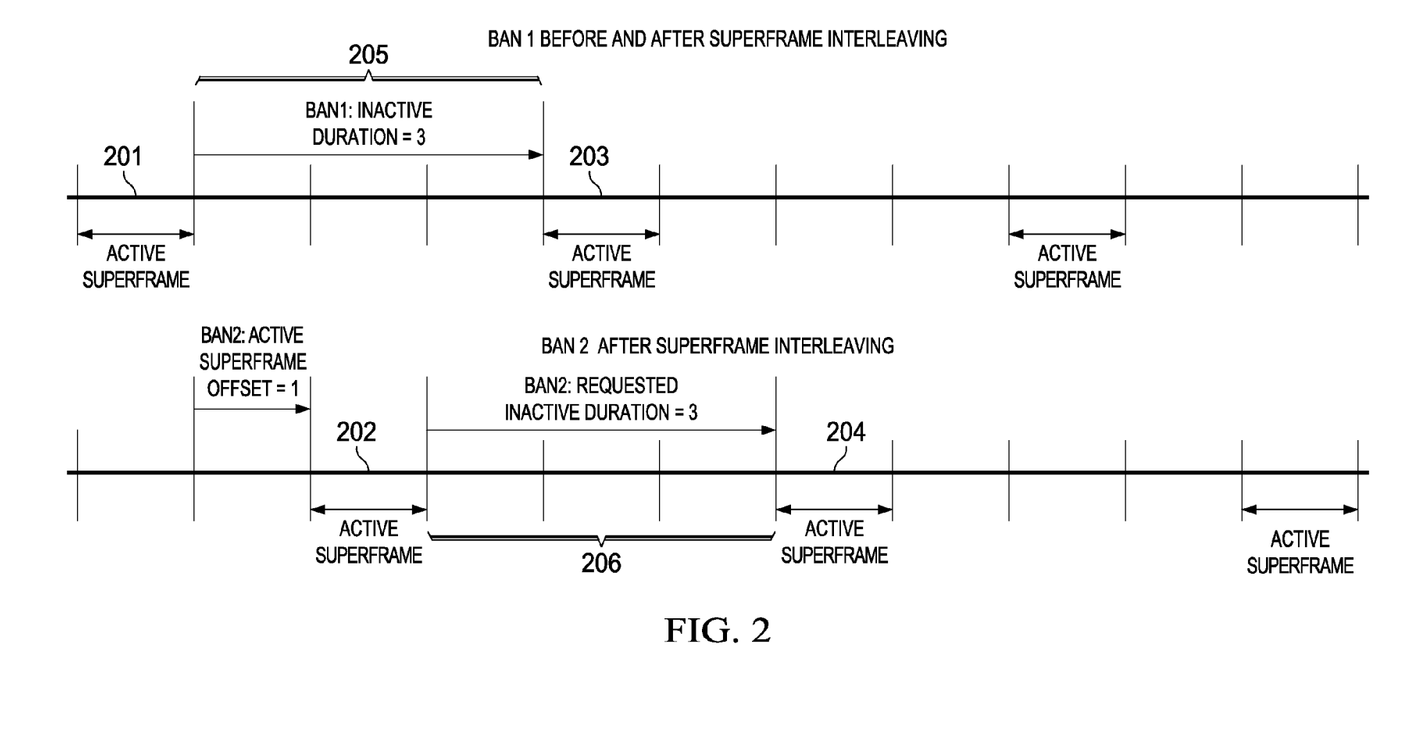
FIG. 2 illustrates the superframes used by two networks (BAN 1 and BAN 2)

When two networks, such as two BANs, operate on the same frequency in close proximity, they may cause interference with each other. Accordingly, the networks may need to adjust their transmissions to avoid transmission overlaps that cause such mutual interference. FIG. 2 illustrates the superframes used by two networks (BAN 1 and BAN 2). Transmissions by these networks in their respective superframes do not cause interference because only one BAN superframe is active at a time. Rather than using a continuously repeating superframe, BAN 1 and BAN 2 transmit in their respective active superframes 201, 202 and then each pass three inactive superframes before transmitting in their next active superframes 203, 204. Because active superframes 201 and 202 are fully offset from each other, they do not occur at the same time. Accordingly, the active superframes 203, 202 for each BAN network occur during an inactive superframe 205, 206 for the other network.

The arrangement of active and interactive superframes illustrated in FIG. 2 may be configured by having the hub in BAN 2 listen to the transmissions of BAN 1. BAN 2's hub could then select an active superframe for use in BAN 2 that is offset from the active superframe used in BAN 1. The hub in BAN 2 may select its active superframe without communicating with BAN 1, if the inactive superframe interval 205 used in BAN 1 is long enough for the BAN 2 active superframe 202 to fit. In other embodiments, the hub in BAN 2 may be required to communicate with the hub in BAN 1 to coordinate on the location and length of their active superframes.

Figure 3:
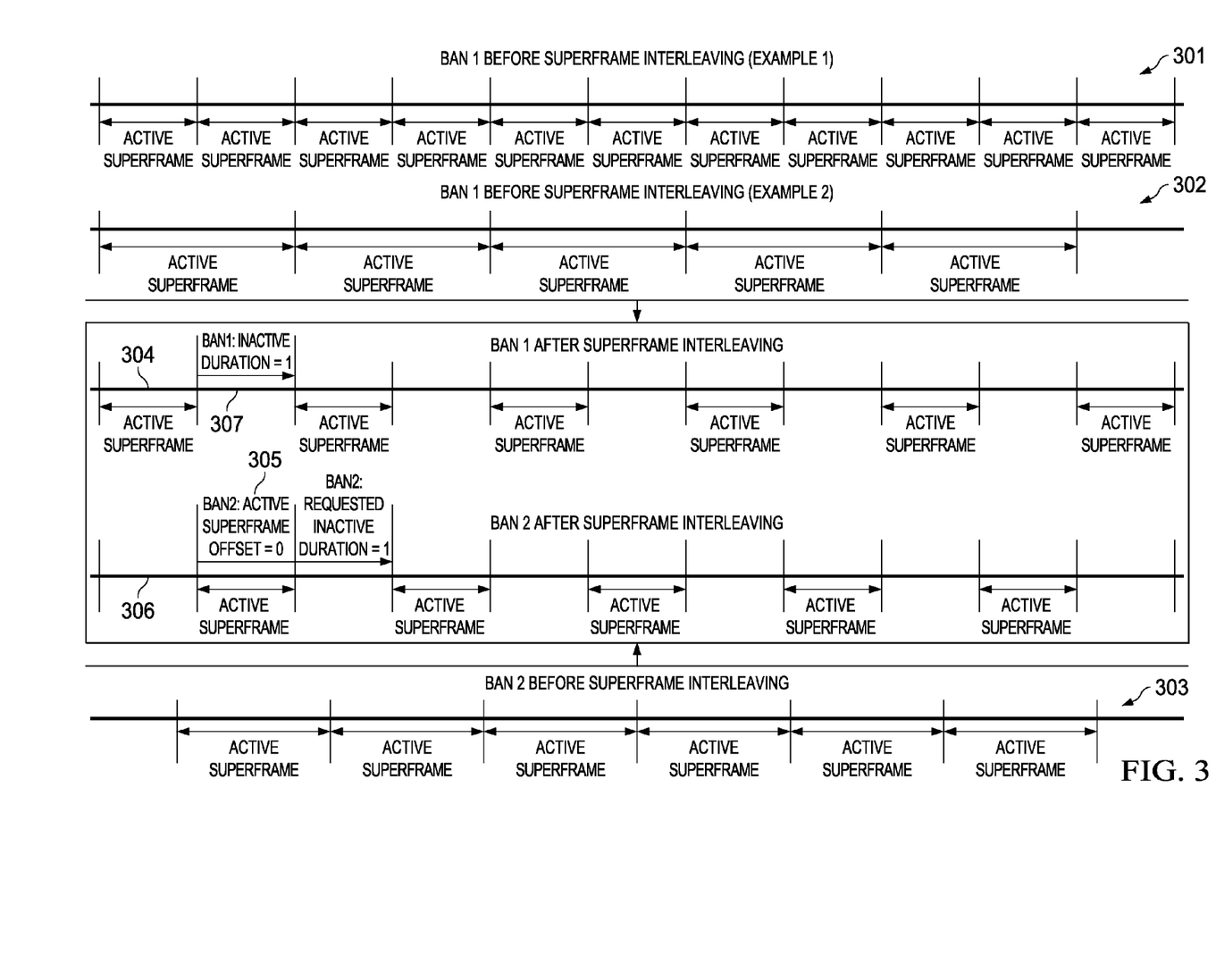
FIG. 3 illustrates superframes used by two networks (BAN 1 and BAN 2) in another embodiment.

FIG. 3 illustrates superframes used by two networks (BAN 1 and BAN 2) in another embodiment. BAN 1 may use continuously repeating active superframes having a duration that is relatively short (301) or relatively long (302). Because the active superframe for BAN 1 is continuously repeating, other network BAN 2 cannot use the same channel without causing interference between the networks. This is particularly true if BAN 2 is also using a continuously repeating active superframe arrangement (303). In the situation illustrated in FIG. 3, the hubs in BAN 1 and BAN 2 will have to communicate with each other to create room for BAN 2 to operate on the same channel as BAN 1.

In one embodiment, the hubs coordinate their respective active superframes 304, 305 so that each network schedules an active superframe during an inactive superframe 306, 307 of the other network. The hubs may select appropriate values for active superframe length, inactive superframe duration, and offset to ensure that the networks can share the same channel without interference.

Beacon Frame

Figure 4:
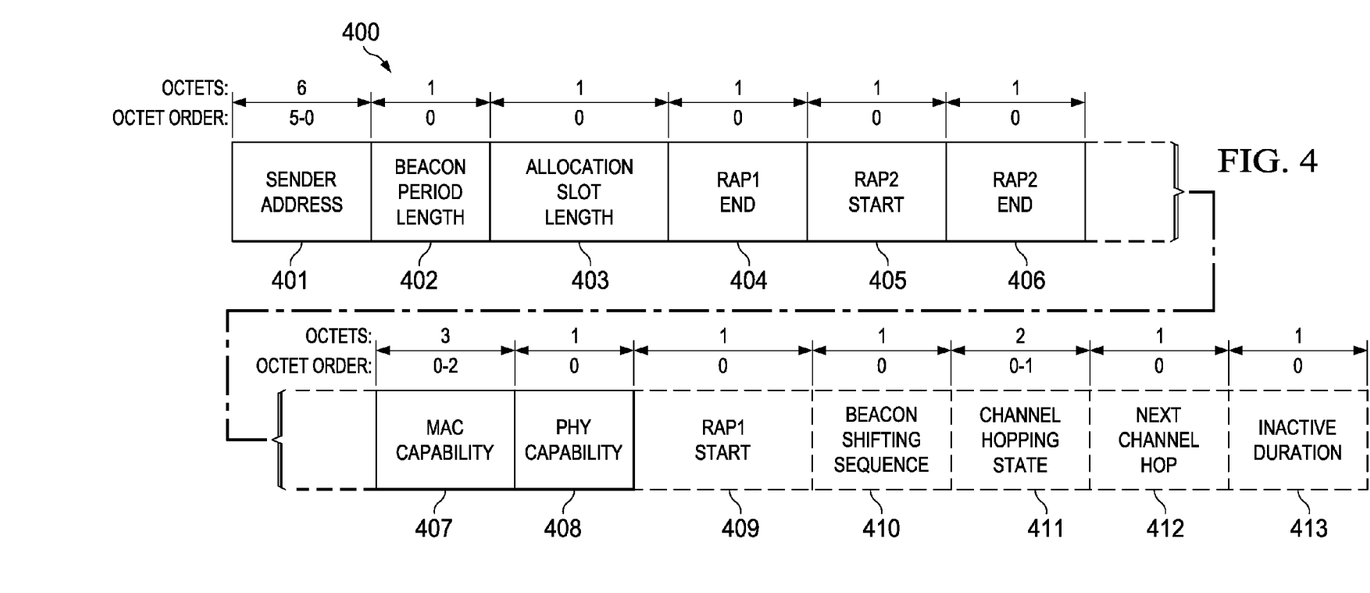
FIG. 4 illustrates a frame payload of a beacon frame according to one embodiment.

FIG. 4 illustrates a frame payload 400 for a Beacon frame according to one embodiment. A frame payload, such as Frame payload 400 may be broadcast by a hub in every superframe in beacon frame 100 (FIG. 1), for example. A Beacon frame is a management-type frame that contains both mandatory fixed-length fields and optional variable-length components that are referred to as information elements (IE).

Sender Address field 401 is set to the MAC address of the hub that is sending the current beacon. Beacon Period Length field 402 is set to the length of the current superframe as measured in units of allocation slots, wherein the superframe may be divided into a plurality of such allocation slots. The allocation slots are numbered 0, 1, . . . , starting from the one that starts the superframe. Allocation Slot Length field 403 is set to the value L such that the length of an allocation slot is equal to a minimum allocation slot length (pAllocationSlotMin) plus L×an allocation slot resolution (pAllocationSlotResolution).

RAP1 Start field 409 is present only if exclusive access phase 1 (EAP1) 102 is of nonzero length, as indicated by EAP Indicator field 701 (FIG. 7) of MAC header 501 of the current beacon frame 400. When present, it is set to the number of the allocation slot whose start time ends EAP1 and starts RAP1, and it occurs after PHY Capability field 408.

RAP1 End field 404 is set to the number of the allocation slot whose end time ends RAP1 103.

RAP2 Start field 405 is set to the number of the allocation slot whose end time ends EAP1 102 and starts RAP2 106, if RAP2 is of nonzero length, or is set to zero otherwise.

RAP2 End field 406 is set to the number of the allocation slot whose end time ends RAP2 106.

MAC Capability field 407 and PHY Capability field 408 indicate support for various functions and functional requirements.

Beacon Shifting Sequence 410 is optional and is present only if beacon shifting is currently enabled. Channel Hopping State field 411 is present only if channel hopping is currently enabled. Next Channel Hop field 412 is present only if channel hopping is currently enabled.

Inactive Duration field 413 is optional and is present only if one or more inactive superframes will start at the end of the current superframe. When present, it is set to the number of inactive superframes after each active superframe. The presence of the Inactive Duration field 413 may be determined by the Non-final Fragment/Cancel/Scale/Inactive field 703 (FIG. 7) within the Frame Control field 601 of the MAC Header 501 as discussed below.

MAC Header Data

Figures 5, 6, 7:
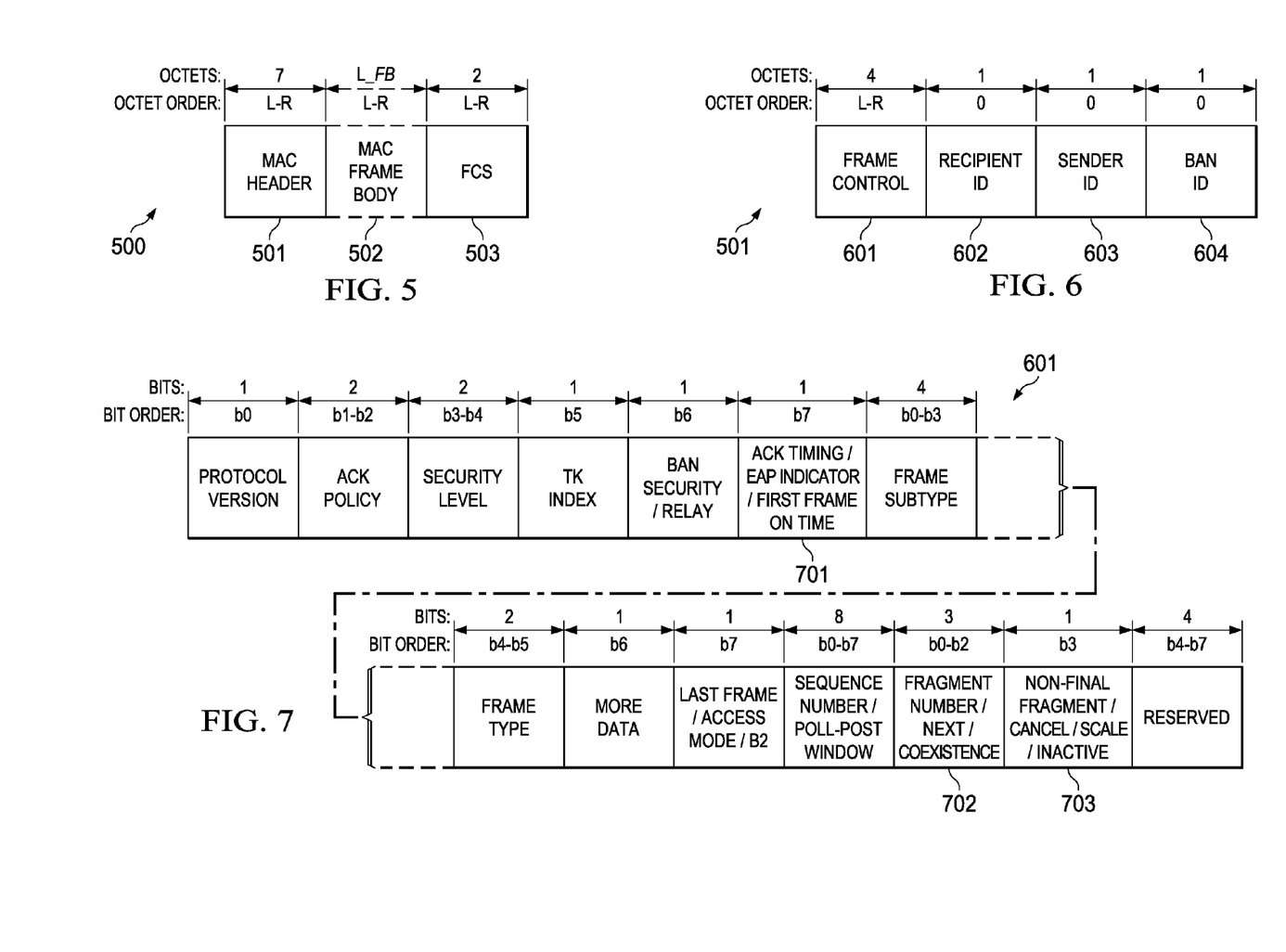
FIG. 5 illustrates a general MAC frame according to one embodiment.
FIG. 6 illustrates a MAC header format according to one embodiment.
FIG. 7 illustrates the format of a Frame Control field according to one embodiment.

The capability of a network to support superframe interleaving may be determined from the MAC header of beacon or B2 frames transmitted by the network hub. FIG. 5 illustrates a general MAC frame 500 according to one embodiment. MAC frame 500 consists of a fixed-length MAC header 501, a variable-length MAC frame body 502, and a fixed-length frame check sequence (FCS) 504. The MAC frame body 502 is present only if it has a nonzero length. When present, it contains a frame payload.

In one embodiment, MAC header 501 may be formatted as shown in FIG. 6. Frame Control field 601 carries access control information about the MAC frame, such as the protocol version, security level, and frame type and subtype. Recipient ID field 602 is set to the abbreviated address of the recipient of the current frame, which may be a node identifier or a hub identifier, for example. Sender ID field 603 is set to the abbreviated address of the sender of the current frame. BAN ID field 604 is set to the abbreviated address of the network in which the current frame is transferred, such as the address of a body area network (BAN).

FIG. 7 illustrates the format of a Frame Control field 601 according to one embodiment. The information carried in Frame Control 601 may vary depending upon the frame type and frame subtype. For example, the information carried in Fragment Number/Next/Coexistence field 702 may vary depending upon whether the frame is a beacon, data, Poll, or other frame. In beacon and B2 frames, field 702 is used as a Coexistence field.

Non-final Fragment/Cancel/Scale/Inactive field 703 also may vary depending upon whether the frame is a beacon, data, Poll, or other frame type. In beacon and B2 frames, field 703 is used as an Inactive field, which is set to indicate whether one or more inactive superframes will start at the end of the current superframe. When the bit in Inactive field 703 is set, the Inactive Duration field 413 (FIG. 4) of the Beacon frame payload is present and will indicate how many inactive superframes follow each active superframe.

Figure 8:
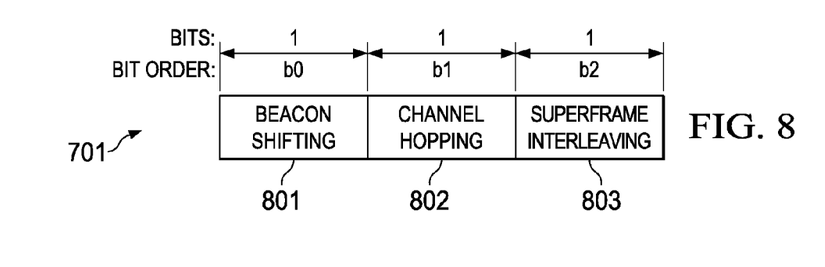
FIG. 8 illustrates the format of a Coexistence field of a beacon or B2 frame according to one embodiment.

FIG. 8 illustrates the format of Coexistence field 701 of beacon or B2 frames according to one embodiment. Beacon Shifting field 801 indicates whether beacon shifting is currently enabled. Channel Hopping field 802 indicates whether channel hopping is currently enabled. Superframe Interleaving field 803 indicates whether the sending hub supports active superframe interleaving which includes support of command frames.

A hub in one network (e.g., BAN 2) may determine whether another network (e.g., BAN 1) supports active superframe interleaving by analyzing the MAC header of beacon or B2 frames that are broadcast by the hub in BAN 1 and determining whether the Superframe Interleaving field 803 has been set.

The hub in BAN 2 may further determine how many inactive superframes follow the current superframe for BAN 1 by parsing the Inactive Duration field 413 of beacon or B2 frames broadcast by BAN 1's hub.

Connection Assignment Frame Data

Figure 9:
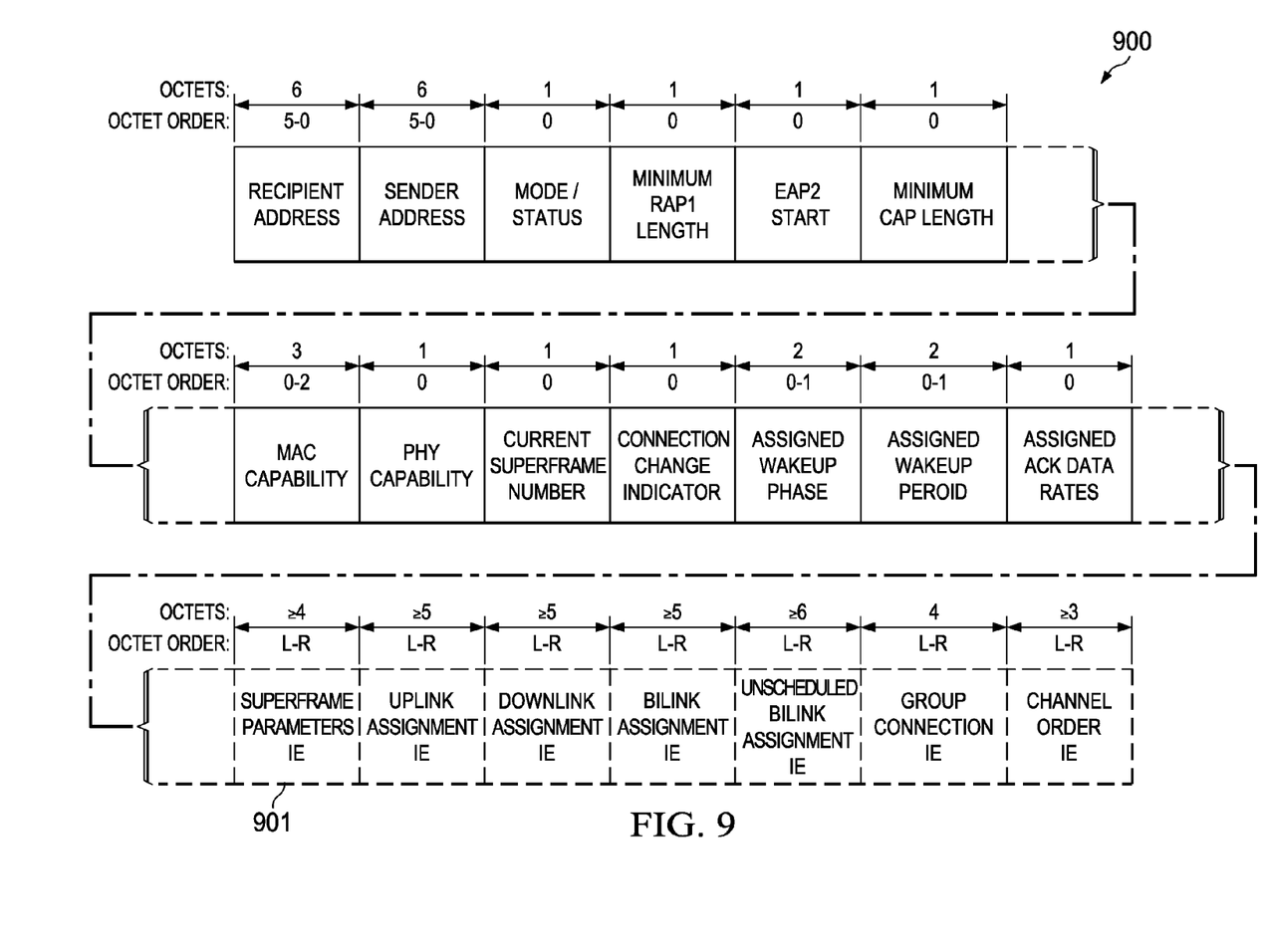
FIG. 9 illustrates an example of a Connection Assignment frame payload according to one embodiment.

A Connection Assignment frame may be transmitted by a hub in response to a connection request from a node or may be used to initiate or change a connection assignment. FIG. 9 illustrates an example of a Connection Assignment frame payload 900 according to one embodiment. Connection Assignment frame payload 900 may carry both mandatory and optional fields. Superframe Parameters information element (IE) 901 is an optional field in Connection Assignment frame payload 900.

Figure 10:
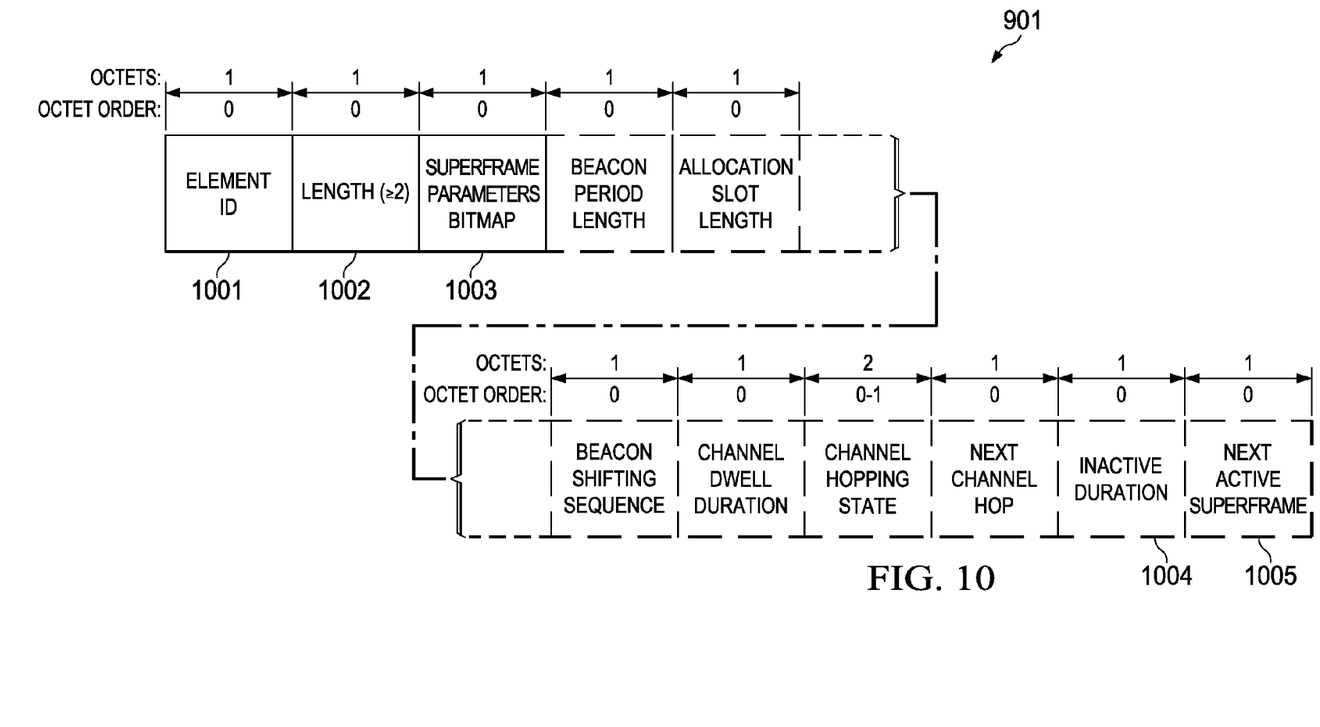
FIG. 10 illustrates a Superframe Parameters information element according to one embodiment.

FIG. 10 illustrates a Superframe Parameters information element 901 according to one embodiment. Superframe Parameters IE 901 also has mandatory and optional fields. Superframe Parameters IE 901 itself is an optional field and, when contained in a Connection Assignment frame, is used to convey the values of chosen superframe operation parameters.

Element ID field 1001 is set to a value that identifies the IE and Length field 1002 is set to the length, in octets, of the fields that follow in the Superframe Parameters IE 901.

Figure 11:
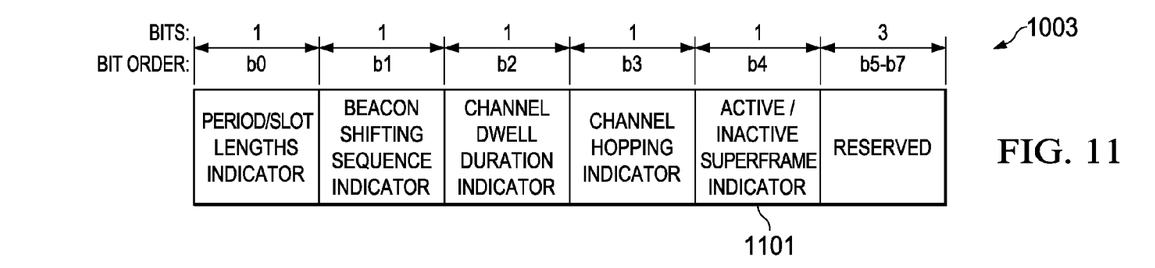
FIG. 11 illustrates the format of a Superframe Parameters Bitmap according to one embodiment.

Superframe Parameters Bitmap field 1003 indicates which optional superframe parameters are present in information element 901. FIG. 11 illustrates the format of a Superframe Parameters Bitmap 1003 according to one embodiment. In one embodiment, Active/Inactive Superframe Indicator field 1101 within Superframe Parameters Bitmap 1003 is set if inactive superframes are periodically provided and both Inactive Duration 1004 and Next Active Superframe 1005 fields are present in this IE, or is set to zero if both fields are absent.

Inactive Duration field 1004 may be set in the same manner as used to set Inactive Duration field 413 in beacon frame payload 400 (FIG. 4). Inactive Duration field 1004 may be present only if one or more inactive superframes are starting at the end of the current superframe. When present, Inactive Duration field 1004 is set to the number of inactive superframes after each active superframe.

Next Active Superframe field 1005 is an optional field that, when present, may be set to the sequence number of the next active superframe.

Accordingly, in addition to using beacon frames to determine the number I of inactive superframes supported by a first network, the Active/Inactive Superframe Indicator field 1101 may be used by other network hubs to determine whether the first network is providing inactive superframes.

Interleaving Process

The encoding described above may be used by one network to determine if other networks support inactive superframes and, if so, how many inactive superframes are present and when they occur.

Referring again to FIG. 2, a first network (BAN 1) is broadcasting beacon or B2 frames in active superframe 201. The hub in a second network (BAN 2) may monitor the beacon frames or B2 frames broadcast by the hub in BAN 1. In the beacon and B2 frames, an Inactive field (702—FIG. 7) of MAC header 501 is used to indicate whether one or more inactive superframes will start at the end of the current superframe. When the Inactive field is set, then an Inactive Duration field (413—FIG. 4) in the beacon frame payload can be read to determine how many inactive superframes follow each active superframe.

With this information, the hub in BAN 2 can learn the timing of the inactive superframes 205 of BAN 1 and can adjust the active superframe 202 timing for BAN 2 to occur during the BAN 1 inactive superframes. As a result, the hub of BAN 2 may control the interleaving of active superframes on its own without the need for communicating with BAN 1.

Referring again to FIG. 3, the first network (BAN 1) is continuously broadcasting beacon or B2 frames in active superframes. Unlike the configuration of FIG. 2, in this case the hub of the second network (BAN 2) must communicate with the hub of the first network to coordinate interleaving of active superframes.

The first step for BAN 2's hub in this situation is to analyze the Coexistence field 701 of the MAC header of beacon or B2 frames broadcast by BAN 1's hub to determine whether BAN 1 will support superframe interleaving. If Superframe Interleaving field 802 of Coexistence field 702 has been set to zero in BAN 1, then BAN 1 will not support interleaving. As a result, BAN 2's hub will need to identify a different channel for operation to avoid interference. On the other hand, if Superframe Interleaving field 802 of Coexistence field 702 has been set to one in BAN 1, then BAN 1 will support interleaving. BAN 2's hub may then attempt to communicate with BAN 1's hub to coordinate interleaved active superframes.

Active Superframe Interleaving Request/Response

In one embodiment, BAN 2's hub and BAN 1's hub exchange Command—Active Superframe Interleaving Request/Response frames to coordinate their active superframe interleaving.

Figure 12:
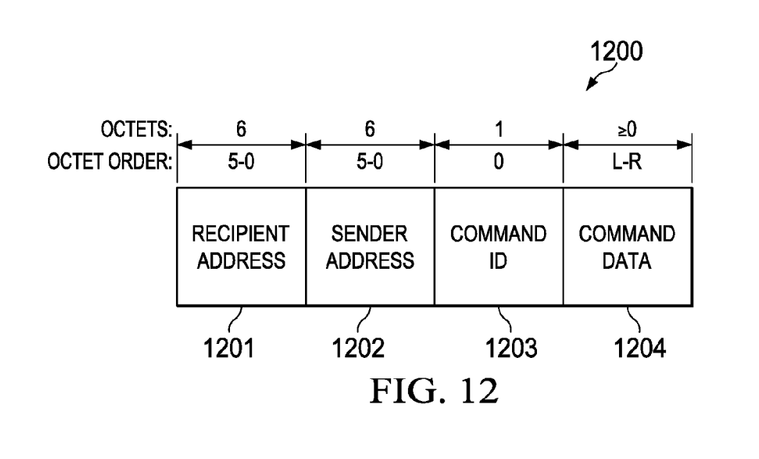
FIG. 12 illustrates a frame payload of a Command frame according to one embodiment.

FIG. 12 illustrates a frame payload 1200 of a Command frame according to one embodiment. Recipient Address field 1201 is set to the MAC address of the recipient of the Command frame, and Sending Address field 1202 is set to the MAC address of the sender of the Command frame. Command ID field 1203 is set to identify the specific command of the Command frame. For example, the value of the Command ID field 1203 is set to indicate that the command is an Active Superframe Interleaving Request or an Active Superframe Interleaving Response frame. Command Data field 1204 contains information specific to the command that is conveyed in the Command frame.

Figure 13:
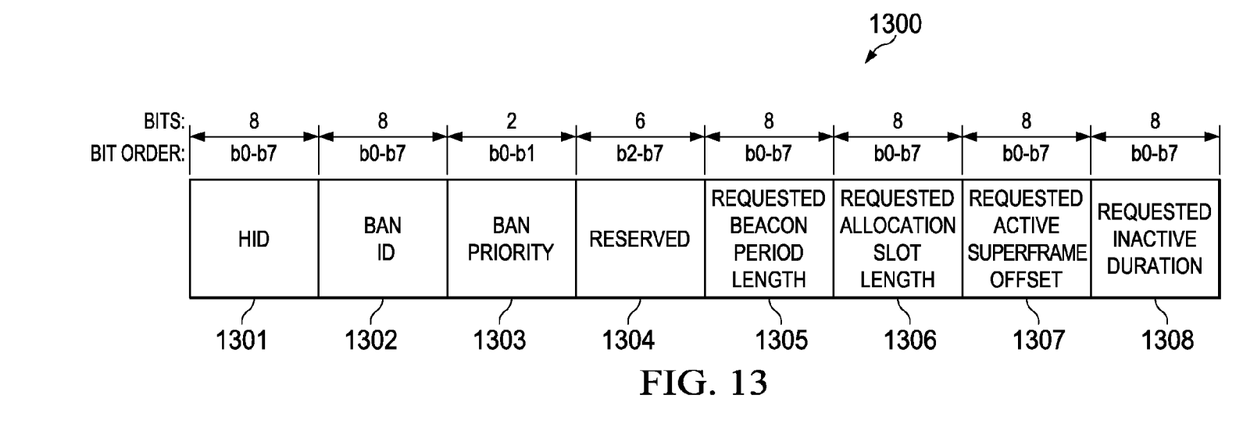
FIG. 13 illustrates the format of a Command Data field of a Command—Active Superframe Interleaving Request frame.

FIG. 13 illustrates the format of a Command Data field (1204) for a Command—Active Superframe Interleaving Request frame 1300. The Active Superframe Interleaving Request frame 1300 is transmitted by a hub to another hub to request for channel sharing through active superframe interleaving.

HID field 1301 is set to an address of the hub that is sending the current Command frame. BAN ID field 1302 may be set to an address of the network of the sending hub. BAN Priority field 1303 is set to indicate the priority of the services provided to the network of the sender of the Command frame. Table 1 lists BAN Priority field encoding according to one embodiment. Generally, the higher the value of this field, the higher the priority of the BAN services.

TABLE 1

| FIELD VALUE IN DECIMAL | BAN SERVICES |
|---|---|
| 0 | Non-medical services |
| 1 | Mixed medical and non-medical services |
| 2 | General health services |
| 3 | Highest priority medical services |

Field 1304 may be reserved for additional data. Requested Beacon Period Length field 1305 is set to the length of the superframe, in units of allocation slots, as requested by the sender of the current frame. In one embodiment, field 1305 is set to zero to encode a value of 256 allocation slots. Requested Allocation Slot Length field 1306 is set to the value L such that the length of an allocation slot is equal to a minimum allocation slot length (pAllocationSlotMin) plus L×an allocation slot resolution (pAllocationSlotResolution).

Requested Active Superframe Offset field 1307 is set to the length, in units of requested superframes or beacon periods defined in the current frame, as requested by the sender of the current frame, between the end of an active superframe of the recipient of the current frame and the start of the next active superframe of the sender of the current frame.

Requested Inactive Duration field 1308 is set to the number of inactive superframes of the sender of the current frame after each active superframe of the sender, as requested by the sender.

Figure 14:
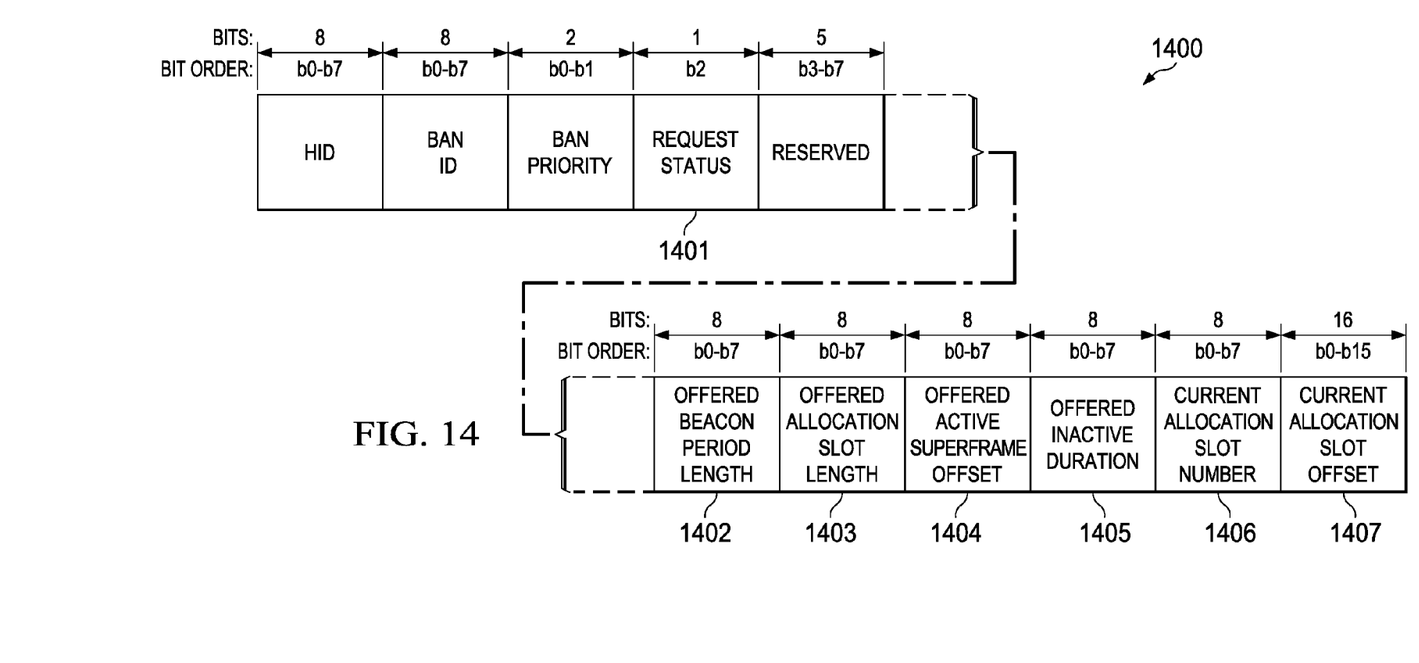
FIG. 14 illustrates the format of a Command Data field of a Command—Active Superframe Interleaving Response frame.

FIG. 14 illustrates the format of a Command Data field (1204) for a Command—Active Superframe Interleaving Response frame 1400. The Active Superframe Interleaving Response frame 1400 is transmitted by a hub to another hub in response to a request for channel sharing through active superframe interleaving.

The Command—Active Superframe Interleaving Response frame 1400 includes HID, BAN ID, BAN Priority and Reserved fields that function as described above for the same fields (1301-1304) in the Command—Active Superframe Interleaving Request frame 1300.

Command—Active Superframe Interleaving Response frame 1400 further includes a Request Status field 1401 that is set to one if the request for active superframe interleaving is accepted or is set to zero if the request is denied.

Offered Beacon Period Length field 1402 is set to the length of the beacon period or superframe, in units of allocation slots, as offered by the sender of the current frame. In one embodiment, field 1402 is set to zero to encode a value of 256 allocation slots. Offered Allocation Slot Length field 1403 is set to value L such that the length of an allocation slot is equal to a minimum allocation slot length (pAllocationSlotMin) plus L×an allocation slot resolution (pAllocationSlotResolution).

Offered Active Superframe Offset field 1404 is set to the length, in units of offered beacon periods or superframes defined in the current frame, as offered by the sender of the current frame, between the end of an active superframe of the sender of the current frame and the start of the next active superframe of the recipient of the current frame.

Offered Inactive Duration field 1405 is set to the number of inactive superframes of the recipient of the current frame after each active superframe of the recipient, as offered by the sender of the current frame.

Current Allocation Slot Number field 1405 is set to a value S such that the sender of the current frame starts sending this frame during the offered allocation slot numbered S. Current Allocation Slot Offset field 1407 is set to F in units of [Offered Allocation Slot Length in microseconds/65536] microseconds such that the sender of the current frame starts sending this frame at F after the start of the offered allocation slot indicated in the preceding field. Here, the function [x] is defined to be the least integer not smaller than x.

To send a Command—Active Superframe Interleaving Request or a Command—Active Superframe Interleaving Response frame, the sender may send the frame as if it were an unconnected node of the recipient's BAN, for both medium access and MAC header setting. The transmission and setting of immediate acknowledgment (I-Ack) frames for acknowledging receipt of the interleaving request or response frames may be the same as for acknowledging receipt of any other frame.

Regardless of whether BAN 1 is operating with a superframe length and inactive duration that are suitable for interleaving BAN 1 and BAN 2's active superframes, BAN 2's hub (Hub 2) may send to BAN 1's hub (Hub 1) a Command—Active Superframe Interleaving Request frame to request active superframe interleaving between the two BANs. However, before sending the Command—Active Superframe Interleaving Request frame, Hub 2 first must receive a beacon or B2 frame of Hub 1 with a Superframe Interleaving field in the MAC header set to indicate support for active superframe interleaving.

If BAN 1 supports active superframe interleaving, which is indicated in the MAC header of its beacon or B2 frame, Hub 1 sends a Command—Active Superframe Interleaving Response frame to Hub 2 to indicate whether Hub 1 accepts or rejects the active superframe interleaving request. If Hub 1 accepts the request, in some cases, it may continue with its current superframe length and inactive duration to enable the offered active superframe interleaving. In other cases, Hub 1 adjusts its superframe length and inactive duration to enable the offered active superframe interleaving before sending its response.

Hub 1 should accept the request if it may continue with its current superframe length and inactive duration to enable the requested superframe interleaving. Hub 1 may deny the request if its inactive duration has been mostly taken by other hubs also for active superframe interleaving. Hub 1 should also accept the request from Hub 2, if Hub 1 has a lower priority than Hub 2.

If Hub 1 rejects the request, then it may continue with its current superframe length and inactive duration, even if it offers alternative superframe and inactive duration values in its response for active superframe interleaving between the two BANs.

If Hub 1 accepts Hub 2's request, Hub 2 should set up or/and adjust its superframe boundary and inactive duration to attain active superframe interleaving as it has requested once hub 1 makes its own adjustment if required as illustrated in FIG. 3.

If Hub 1 rejects Hub 2's request, Hub 2 may send another request for active superframe interleaving based on the alternative offer in Hub 1's response, or may start or continue BAN 2 operation in the same channel without regard to active superframe interleaving.

Hub 2 may send to Hub 1 another Command—Active Superframe Interleaving Request frame even if it has previously sent such a frame containing the same or different requested field values. If the new request is accepted, it shall supersede the previous request. If the new request is rejected, the last accepted request, if any, shall remain valid.

If Hub 2 previously sent to Hub 1 a request for active superframe interleaving and the request was accepted by Hub 1, Hub 2 should send to Hub 1 another request when Hub 2 needs fewer or no active superframes.

Hub 1 may send to Hub 2 a Command—Active Superframe Interleaving Request frame for active superframe interleaving any time as well, following the procedure specified in the above with hub 1 and hub 2 swapping their roles.

Figure 15:
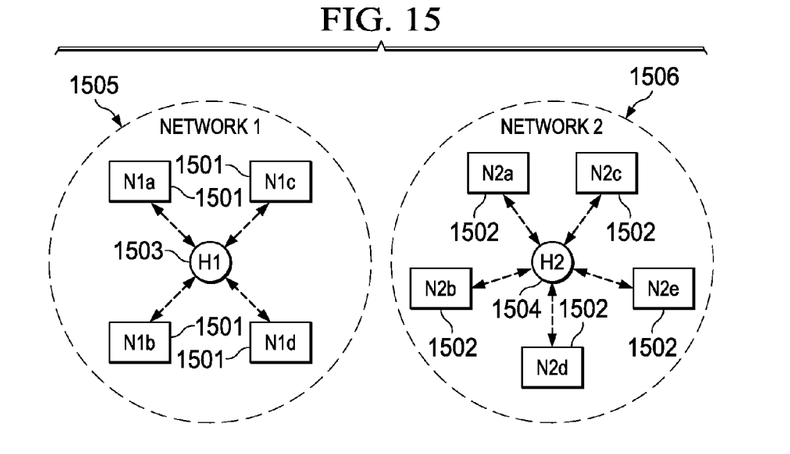
FIG. 15 is a block diagram illustrating a network topology employing embodiments of the invention.

FIG. 15 is a block diagram illustrating a network topology employing embodiments of the invention. Nodes 1501, 1502 and hubs 1503, 1504 are organized into logical sets, referred to as networks. In the illustrated embodiment, there is only one hub in a network, but the number of nodes in a network may vary. For example, network 1 1505 comprises hub 1503 and plurality of nodes 1501, and network 2 1506 comprises hub 1504 and plurality of nodes 1502. In one embodiment, data is exchanged within the same network only. In another embodiment of the invention, commands are exchanged between hubs of different networks for coordination of active superframe interleaving.

Figure 16:
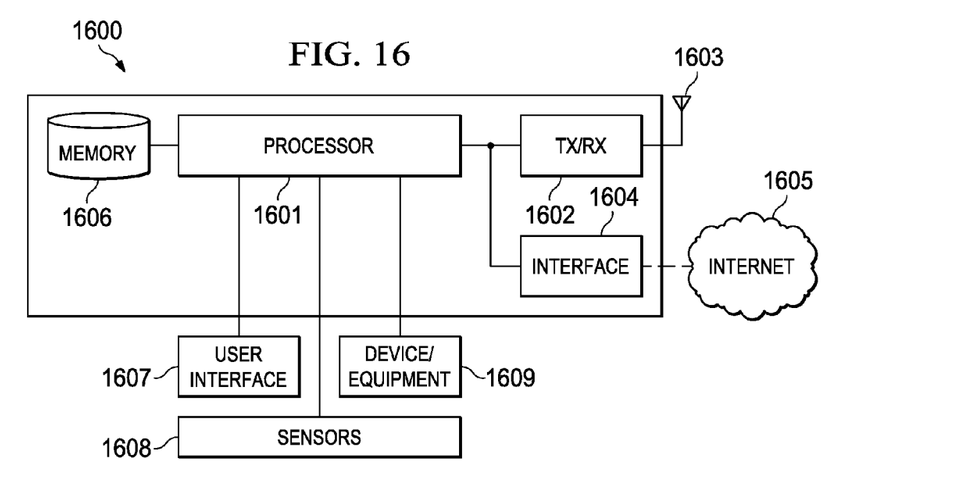
FIG. 16 is a block diagram of an exemplary embodiment of a device implementing embodiments of the invention.

FIG. 16 is a block diagram of an exemplary embodiment of a device 1600 implementing embodiments of the invention. Device 1600 may be used as a node 1501, 1502 and/or a hub 1503, 1504 in FIG. 15. In one embodiment, device 1600 is a hub, gateway, or controller controlling and communicating with one or more nodes or with other hubs. In another embodiment, device 1600 is a low-power wireless node operating on, in, or around a human or non-human body and communicating with a hub or another node to service one or more applications, such as medical connections, consumer electronics, and personal entertainment.

Processor 1601 processes data exchanged with other nodes or hubs via transceiver 1602 and antenna 1603 and/or via wired interface 1604 coupled to Internet or another network 1605. Processor 1601 may be a software, firmware, or hardware based device or a combination thereof. Processor 1601 may also generate and process messages sent to, and received from, another device, such as the Commands for active superframe interleaving request or response.

Memory 1606 may be used to store MAC header and frame payload of beacon, B2, and other frames. Memory 1606 may also be used to store computer program instructions, software and firmware used by processor 1601. It will be understood that memory 1606 may be any applicable storage device, such as a fixed or removable RAM, ROM, flash memory, or disc drive that is separate from or integral to processor 1601.

Device 1600 may be coupled to other devices, such as user interface 1607, sensors 1608, or other devices or equipment 1609. Device 1600 may be adapted to operate in a body area network either as a node or as a hub controlling a plurality of nodes and coordinating with other hubs for coexistence. Sensors 1608 may be used, for example, to monitor vital patient data, such as body temperature, heart rate, and respiration. Equipment 1609 may be, for example, a monitor or other device that receives and analyzes signals, such as a patient's temperature, heart rate, and respiration, from another node. Alternatively, equipment 1609 may be a device for providing a service to a patient, such as controlling an intravenous drip, respirator, or pacemaker.

It will be understood that the networks 1505, 1506 in FIG. 15 and the device 1600 in FIG. 16 are presented for illustrative purposes only and are not intended to limit the scope of the systems or devices that are capable of employing the active superframe interleaving procedure described herein.

The interleaving of active superframes as described herein may be used in a Body Area Network (BAN) or in any other network or system, such as in the system described in U.S. patent application Ser. No. 12/697,110, filed Jan. 29, 2010, and titled "Frame Structure for Medium Access in Body Area Networks (BAN)," the disclosures of which are hereby incorporated in their entirety herein.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
    detecting, at a first body area network (BAN) device in a first body area network (BAN1), a second device in a second body area network (BAN2), the second BAN device transmitting and receiving signals on a selected channel during the second body area network's active superframes;
    wherein the superframe is operating in a beacon mode as a beacon period;
    determining, at the first BAN device, whether the second BAN device supports coexistence of independent body area networks through active superframe interleaving between body area networks on the selected channel;
    sending an interleaving request from the first BAN device in the first body area network to the second BAN device in the second body area network if the second BAN device supports coexistence through active superframe interleaving between body area networks;
    receiving an interleaving response at the first device from the second BAN device, the response identifying one or more inactive superframes of the second BAN device; and
    adapting active superframes at the first BAN device to fit within the inactive superframes of the second BAN device.

2. The method of claim 1, wherein the second BAN device indicates support for coexistence of independent BAN devices through active superframe interleaving on the selected channel by a setting of a component of a coexistence field of a medium access control (MAC) frame header.

3. The method of claim 1, wherein the first BAN device transmits and receives signals only within the first body area network's active superframes.

4. The method of claim 1, further comprising:
    before determining at the first BAN device whether the second BAN device supports coexistence of independent BAN devices through active superframe interleaving on the selected channel, determining at the first BAN device if the second BAN device is currently providing inactive superframes; and
    transmitting and receiving signals at the first BAN device during the current inactive superframes of the second BAN device.

5. The method of claim 4, further comprising:
    identifying at the first BAN device the current inactive superframes of the second BAN device.

6. A body area network (BAN) device in a first body area network (BAN1), comprising:
    a circuit for sending signals to and receiving signals from a second BAN device in a second body area network BAN2;
    a memory for storing active superframe and inactive superframe information for the BAN device and for the second BAN device; and
    a processor adapted to perform operations on the signals sent to or received from the second BAN device, the processor operating to:
        determine, based on signals received from the second BAN device, whether the second BAN device supports coexistence of independent networks through active superframe interleaving on a selected channel;
    wherein the superframe is operating in a beacon mode as a beacon period;
        generate an interleaving request to be sent to the second BAN device in the second body area network if the second BAN device supports said coexistence;
        identify one or more inactive superframes of the second body area network based upon an interleaving response received from the second BAN device; and
        adapt the first BAN device's superframes in the first body area network to fit within the inactive superframes of the second BAN device in the second body area network.

7. The BAN device of claim 6, the processor further operating to:
    detect support for coexistence of independent body area networks through active superframe interleaving on the selected channel by analyzing a setting of a component of a coexistence field of a medium access control (MAC) frame header received from the second BAN device.

8. The BAN device of claim 6, the processor further operating to:
    adapt superframes of the BAN device to fit within inactive superframes of the second device.

9. The BAN device of claim 6, the processor further operating to:
    determine if the second BAN device is currently providing inactive superframes; and adapt active superframes of the BAN device to fit within current inactive superframes of the second BAN device.

10. The BAN device of claim 9, the processor further operating to:
identify the current inactive superframes of the second BAN device.

11. A method for providing coexistence between a first body area network BAN and a second body area network through active superframe interleaving, comprising:
determining, at a hub in the second body area network, whether the first body area network is currently providing inactive superframes on a selected channel;
wherein the superframe is operating in a beacon mode as a beacon period;
if the first body area network is currently providing inactive superframes, adjusting active superframes of the second body area network to fit within the current inactive superframes of the first body area network;
if the first body area network is not currently providing inactive superframes, determining whether a hub of the first body area network supports coexistence with other body area networks through active superframe interleaving on the selected channel;
if the first body area network supports said coexistence, sending an interleaving request from the hub in the second body area network to the hub in the first body area network;
receiving an interleaving response at the hub of the second body area network from the hub in the first body area network, the response identifying one or more new inactive superframes of the first body area network; and
adjusting active superframes of the second body area network to fit within the new inactive superframes of the first body area network.

12. The method of claim 11, wherein the hub of the first body area network indicates support for coexistence of independent body area networks through active superframe interleaving on the selected channel by a setting of a component of a coexistence field of a medium access control (MAC) frame header.

13. The method of claim 11, further comprising:
identifying the current inactive superframes of the first body area network at the hub of the second body area network.

14. A method, comprising:
transmitting and receiving signals, at a first body area network (BAN) device, on a selected channel during active superframes of the first BAN device;
wherein the superframe is operating in a beacon mode as a beacon period;
setting a component of a coexistence field of a medium access control (MAC) frame header at the first BAN device to indicate support for coexistence of independent BAN networks through active superframe interleaving on the selected channel;
receiving an interleaving request from a second BAN device; and
sending an interleaving response to the second BAN device from the first BAN device, the response identifying one or more inactive superframes of the first BAN device.

15. The method of claim 14, further comprising:
adapting the active superframes of the first BAN device to create the inactive superframes of the first BAN device after receiving the interleaving request from the second BAN device.

16. The method of claim 14, further comprising:
setting an inactive duration field of a medium access control (MAC) frame header at the first BAN device to indicate the presence of one or more inactive superframes of the first BAN device.

17. A body area network (BAN) device, comprising:
a circuit for sending signals to and receiving signals from another BAN device; a memory for storing active superframe and inactive superframe information for the BAN device and for the other BAN device;
and wherein the superframe is operating in a beacon mode as a beacon period;
a processor adapted to perform operations on the signals sent to or received from the other BAN device, the processor operating to:
process signals transmitted and received on a selected channel during active superframes of the BAN device;
set a component of a coexistence field of a medium access control (MAC) frame header at the BAN device to indicate support for coexistence of independent body area networks through active superframe interleaving on the selected channel;
receive an interleaving request from the other BAN device; and
send an interleaving response to the other BAN device, the response identifying one or more inactive superframes of the BAN device.

18. The BAN device of claim 17, the processor further operating to:
adapt the active superframes of the BAN device to create the inactive superframes of the BAN device after receiving the interleaving request from the other BAN device.

19. The BAN device of claim 17, the processor further operating to: set an inactive duration field of a medium access control (MAC) frame header at the BAN device to indicate the presence of one or more inactive superframes of the BAN device.

* * * * *